(12) United States Patent  (10) Patent No.: US 7,474,445 B2
Suzuki et al.  (45) Date of Patent: Jan. 6, 2009

(54) IMAGE FORMING APPARATUS

(75) Inventors: Minoru Suzuki, Yokohama (JP); Takuya Kotsuji, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1016 days.

(21) Appl. No.: 10/798,406

(22) Filed: Mar. 12, 2004

(65) Prior Publication Data

US 2005/0200908 A1 Sep. 15, 2005

(51) Int. Cl.
  *H04N 1/04* (2006.01)
(52) U.S. Cl. .............. 358/474; 358/1.15; 358/500; 382/284; 382/232; 348/312
(58) Field of Classification Search ............ 358/474, 358/486, 500, 1.15; 382/284, 232; 348/312, 348/311
  See application file for complete search history.

(56) References Cited

U.S. PATENT DOCUMENTS

| 5,264,944 | A  | * | 11/1993 | Takemura ............. 386/38 |
| 6,850,252 | B1 | * | 2/2005  | Hoffberg ............. 715/716 |
| 7,057,657 | B1 | * | 6/2006  | Ishihara et al. ......... 348/312 |
| 7,145,681 | B2 | * | 12/2006 | Kato ............. 385/1.15 |
| 7,236,272 | B2 | * | 6/2007  | Huang et al. ......... 358/474 |
| 2004/0156055 | A1 | * | 8/2004 | Matsui et al. ......... 358/1.1 |
| 2004/0190044 | A1 | * | 9/2004 | Hashimoto et al. ...... 358/1.15 |
| 2004/0221234 | A1 | * | 11/2004 | Imai ............. 715/531 |

FOREIGN PATENT DOCUMENTS

| JP | 3-84561 A     | 4/1991 |
| JP | 2000-216931 A | 8/2000 |
| JP | 2002-109527 A | 4/2002 |
| JP | 2003-067243 A | 3/2003 |
| JP | 2003-078769 A | 3/2003 |
| JP | 2003-091425 A | 3/2003 |

* cited by examiner

*Primary Examiner*—Edward L. Coles
*Assistant Examiner*—Negussie Worku
(74) *Attorney, Agent, or Firm*—Foley & Lardner LLP

(57) ABSTRACT

An image forming apparatus includes an interface which receives a job of requesting an accelerator function, from the outside, a processing path decision section which determines whether a first image processing path to perform image processing in a copy operation overlaps a second image processing path to perform image processing in the execution of the accelerator function in the job received via the interface, and an image processing section which performs image processing in a copy operation and image processing in the execution of the accelerator function at the same time, when the processing path decision section determines that the first image processing path does not overlap the second image processing path.

9 Claims, 6 Drawing Sheets

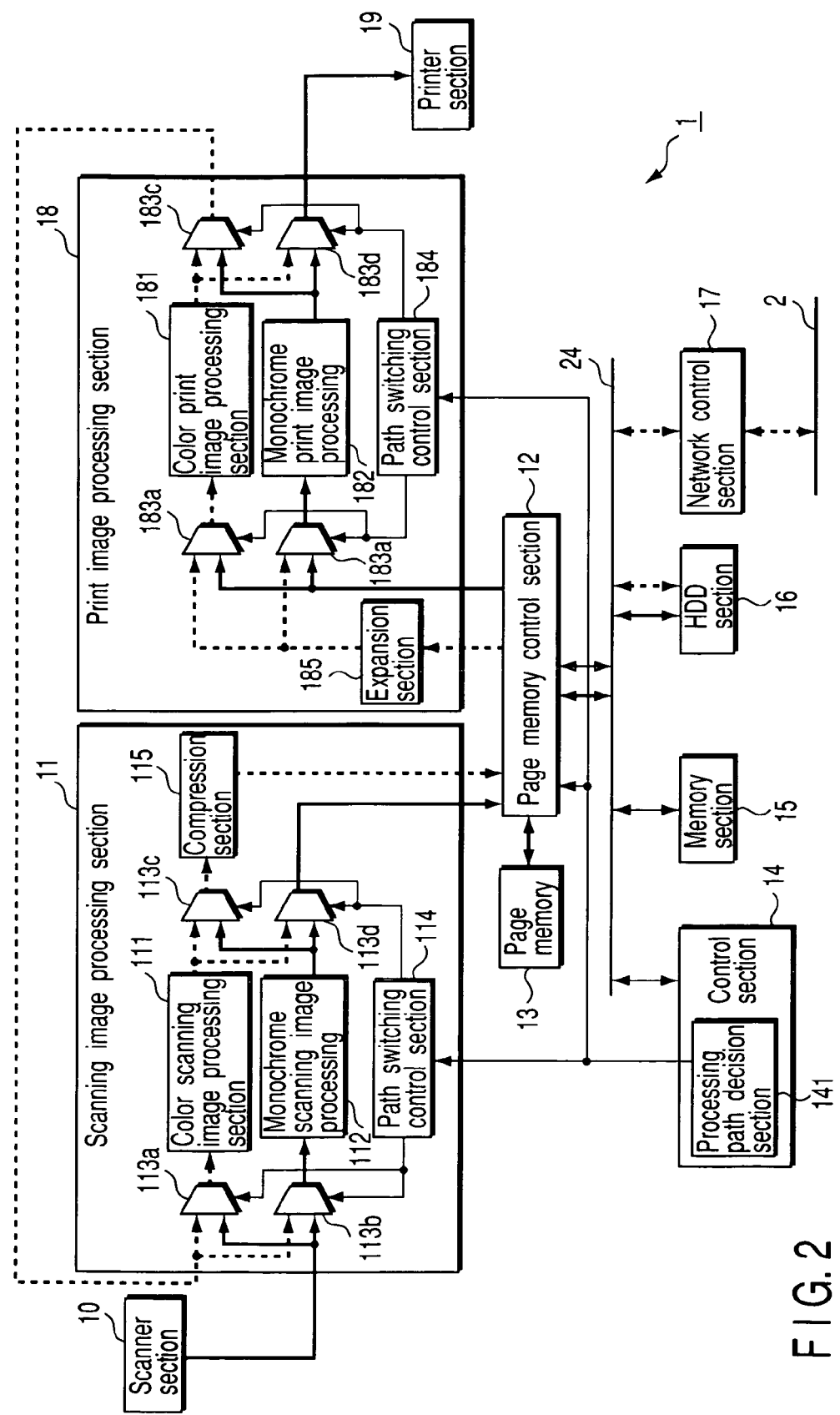
F I G. 2

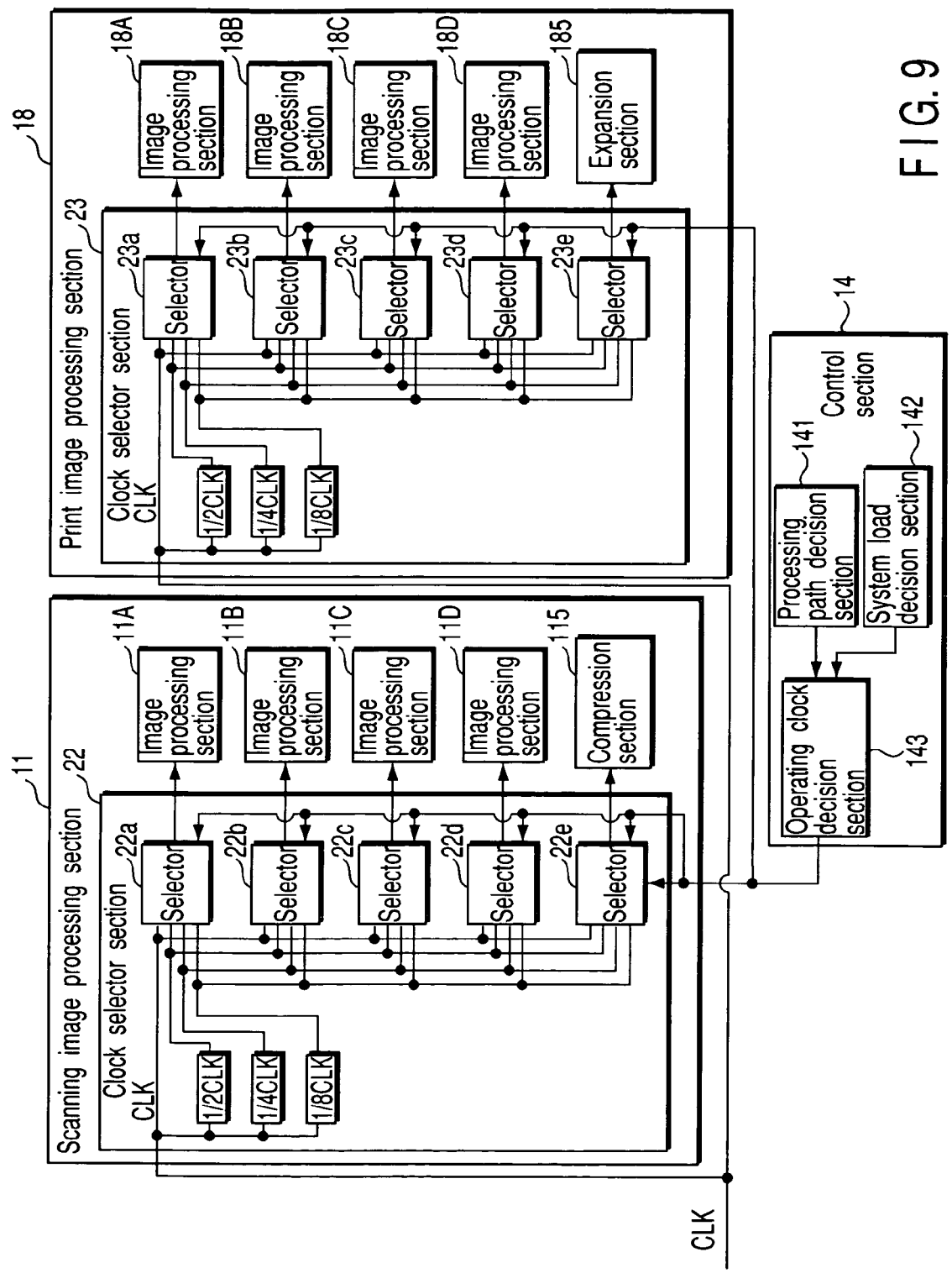
F I G. 9

IMAGE FORMING APPARATUS

BACKGROUND OF THE INVENTION

1. Field of the Invention

This invention relates to an image forming apparatus with an image processing function composed of hardware.

2. Description of the Related Art

It is known that an image forming apparatus, such as an MFP (multifunction peripheral) with an image processing function composed of hardware, such as a copy function, can be used as an image processing accelerator using an application in a personal computer connected to a network. In such an image forming apparatus, since the image processing path is shared by a copy function and the execution of the accelerator function, they cannot be executed at the same time. Therefore, when the copy operation, the operation mode of high priority, was being performed, the accelerator function could not be carried out, which forced the end of the copy operation to be waited for. In addition, when a copy operation took place while the accelerator function was in operation, the accelerator function had to be stopped to carry out the copy operation of high priority.

Furthermore, when a PC gave a plurality of jobs requesting the accelerator function, the jobs were processed just in the order in which a request was made, since the contents of the image processing needed for each job was not taken into account. Therefore, it was necessary to update the parameter setting for the image processing on a job basis, which resulted in a decrease in the performance of the accelerator function.

Accordingly, there is a need for an image forming apparatus capable of alleviating restrictions on the accelerator function due to a copy operation and performing the copy operation and the accelerator function at the same time efficiently.

BRIEF SUMMARY OF THE INVENTION

According to an aspect of the present invention, an image forming apparatus comprises: an interface which receives a job of requesting an accelerator function, from the outside; a processing path decision section which determines whether a first image processing path to perform image processing in a copy operation overlaps a second image processing path to perform image processing in the execution of the accelerator function in the job received via the interface; and an image processing section which performs image processing in a copy operation and image processing in the execution of the accelerator function at the same time, when the processing path decision section determines that the first image processing path does not overlap the second image processing path.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

FIG. 2 schematically shows an internal configuration of the image forming apparatus of the first embodiment;

FIG. 9 shows a configuration for changing the clock for the image processing section according to the load on the system in a fourth embodiment of the present invention.

DETAILED DESCRIPTION OF THE INVENTION

Hereinafter, referring to the accompanying drawings, each embodiment of the present invention will be explained.

First Embodiment

Figure 1:
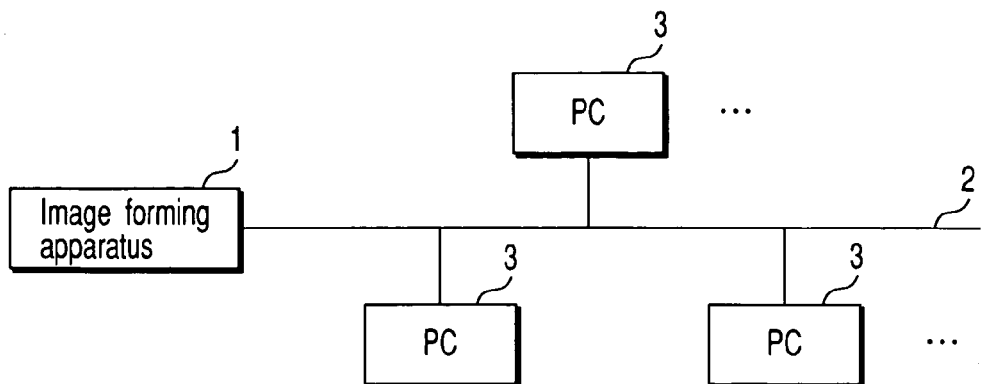
FIG. 1 shows the configuration of a network to which an image forming apparatus according to a first embodiment of the present invention is connected.

FIG. 1 shows the configuration of a network to which an image forming apparatus 1 is connected. As shown in FIG. 1, a plurality of personal computers (PC) 3 are connected via a LAN (Local Area Network) 2 to the image forming apparatus 1.

FIG. 2 schematically shows an internal configuration of the image forming apparatus 1. The image forming apparatus 1 comprises a scanner section 10, a scanning image processing section 11, a page memory control section 12, a page memory 13, a control section 14, a memory section 15, a hard disk drive (HDD) section 16, a network control section 17, a print image processing section 18, and a printer section 19. The page memory control section 12, page memory 13, control section 14, memory section 15, HDD section 16, and network control section 17 are connected via a bus line 24. The control section 14 has a processing path decision section 141.

The scanner section 10 has, for example, four color line sensors of a red (R), a green (G), a blue (B), and a black (BK) color, a fluorescent lamp, and an image processing section (which are not shown). Then, a document placed in a specific position or a document sent from an ADF is exposed with light from the fluorescent lamp. The reflected light is received by the line sensors. After an analog signal representing the amount of the received light is amplified, the amplified signal is subjected to various corrections, including shading correction and nonlinear correction. Then, the resulting signal is outputted as color image data or monochrome image data to the scanning image processing section 11. The scanner section 10 is similar to a conventional equivalent, so a detailed explanation of it will be omitted.

The scanning image processing section 11 is a processing section which processes the image data inputted from the scanner section 10, or from the PC 3 via the network control section 17 and bus line 24. The scanning image processing section 11 includes a color scanning image processing section 111, a monochrome scanning image processing section 112, path switching sections 113a to 113d, a path switching control section 114, and a compression section 115. The color scanning image processing section 111 subjects the inputted RGB color image data to, for example, a color converting process, a filtering and density adjusting process, a surface processing, an identifying process, and so forth. The monochrome scanning image 112 subjects the inputted monochrome image data to, for example, a filtering process, a density adjusting process, and so forth. According to the instruction from the processing path decision section 141, the path switching control section 114 switches each of the path switching sections 113a to 113d to switch the image data inputted to the color scanning image processing section 111 and monochrome scanning image processing section 112 or the image data outputted from the color scanning image processing section 111 and monochrome scanning image processing section 112. The compression section 115 subjects the image data to a compressing process to suppress the amount of data in the color image data.

The page memory control section 12 controls the input and output of image data to the scanning image processing section 11, page memory 13, HDD section 16, print image processing section 18, and so forth. The page memory 13 is used to store a specific amount of image data temporarily in processing the image data.

The control section 14 controls the individual sections of the image forming apparatus 1 comprehensively. The processing path decision section 141 in the control section 14 determines an image processing path for doing image processing on the basis of the user's instruction from a control panel (not shown) in a copy operation or on the basis of the user's instruction from the PC in the execution of the accelerator function. When receiving the job of requesting the accelerator function in a copy operation, or when receiving a copy instruction from the control panel during the operation of the accelerator function, the processing path decision section 141 determines whether there is a part where the two image processing paths overlap each other. After determining the image processing section, the processing path decision section 141 gives an instruction to the path switching control section 114 and path switching control section 184 to cause the scanning image processing section 11 and print image processing section 18 to carry out the process using the determined path. The process of the process path decision section 141 may be, for example, a software process of reading a control program from the storage section of the control section 14 and executing the program or a hardware process using circuitry.

Figures 3, 8:
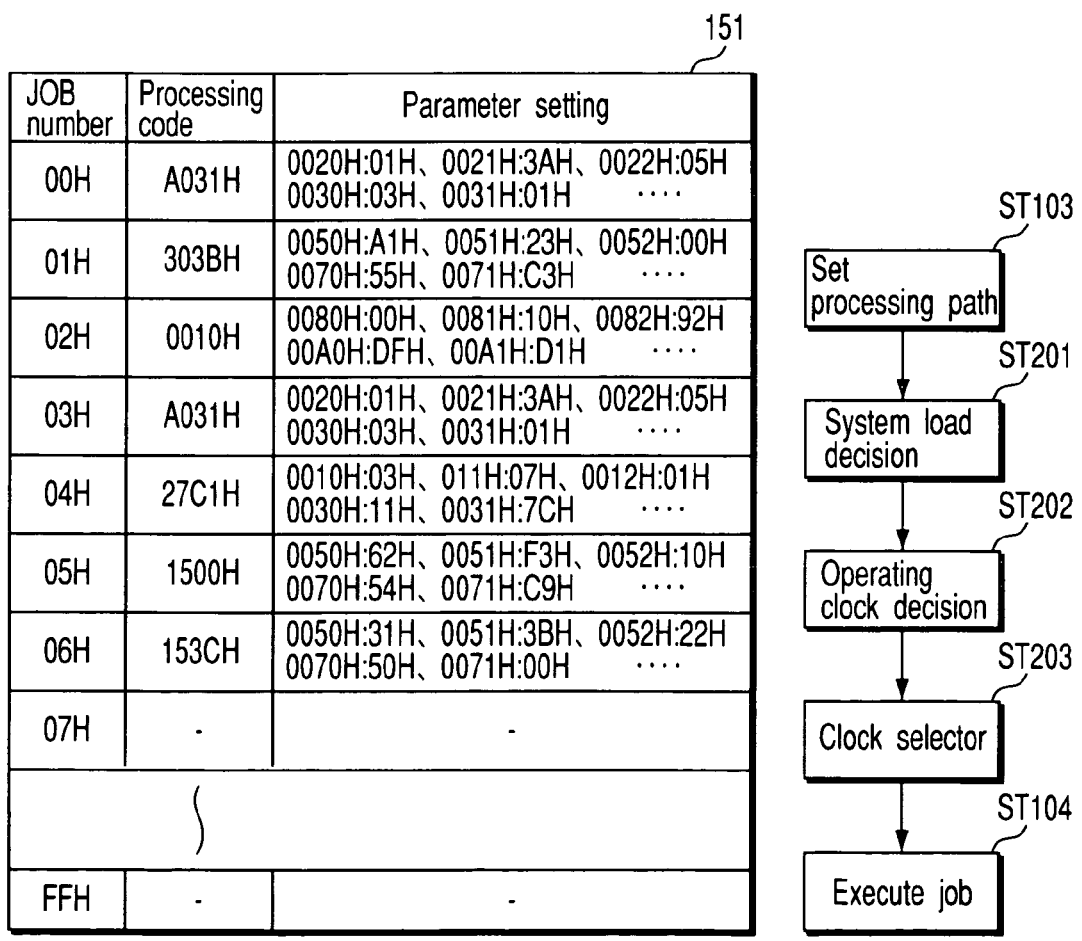
FIG. 3 is a management table of the first embodiment.
FIG. 8 is a flowchart to help explain the process of selecting a clock for the image processing section of the third embodiment suitably.

The memory section 15 has an area which stores various control programs to realize the function of an image forming apparatus including a control program to realize the copy function the control section 14 executes and a control program for the PC 3 connected to the LAN 2 to use as a hardware accelerator, a work area necessary for the control section 14 to execute a control program, an area to store a management table 151 explained later, and so forth. When the PC 3 uses the control program as an accelerator function, the PC 3 transfers the target file temporarily to the HDD section 16 via the network control section 17. Then, the image processing items to which the file is to be subjected are specified on the PC 3 and a processing start is instructed. The management table 151 is provided to manage the jobs where the accelerator function has been requested after the start of the processing. FIG. 3 shows an example of the management table 151. In the management table 151, processing codes and parameter settings are stored on a job number basis. The processing code indicates the functional block necessary for image processing. The parameter setting represents the setting of a parameter for each image processing used in the functional block.

The HDD section 16, which is designed to store a large amount of data in a hard disk, stores a plurality of files and so forth.

The network control section 17 not only stores the image data inputted from the PC 3 via the LAN 2 into the HDD section 16 but also outputs the image data processed by the accelerator function stored in the HDD section 16 to the PC 3 via the LAN 2.

The print image processing section 18 is a processing section which processes the image data inputted from the scanner section 10 via the page memory control section 12 or the like or the image data inputted from the PC 3 via the network control section 17 or the like. The print image processing section 18 includes a color print image processing section 181, a monochrome print image processing section 182, path switching sections 183a to 183d, a path switching control section 184, and an expansion section 185. The color print image processing section 181 subjects the inputted color image data to, for example, an ink-in process, a gradation process, and the like. The monochrome print image processing section 182 subjects the inputted monochrome image data to, for example, a smoothing process, a gradation process, and the like. According to the instruction, the process path decision section 141, the path switching control section 184 switches each of the path switching sections 183a to 183d to switch the image data inputted to the color print image processing section 181 and monochrome print image processing section 182 or the image data outputted from the color print image processing section 181 and monochrome print image processing section 182. The expansion section 185 carries out a decode process of decoding the compressed image data.

When receiving the image data outputted from the print image processing section 18, the printer section 19 makes prints on the basis of the image data. Since the configuration and operation of making prints on the basis of the image data in the printer section 19 are the same as those of a conventional equivalent, an explanation of them will be omitted.

As above the configuration, image forming apparatus 1 is realized to the function that is copying function and hardware accelerator function for image processing, and so on, as image forming apparatus.

Figure 4:
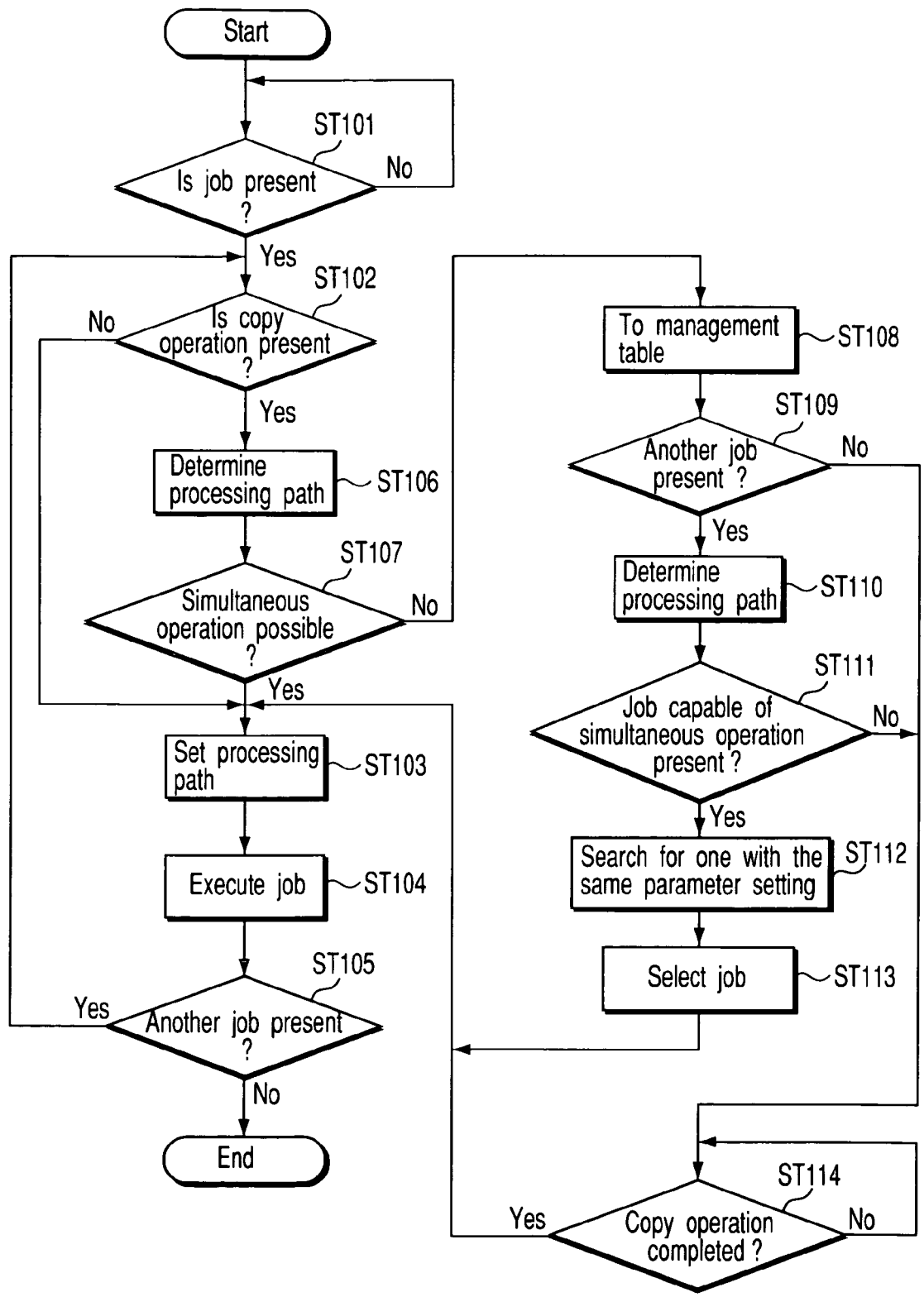
FIG. 4 is a flowchart to help explain the process carried out when the job of requesting the accelerator function is received, while the copy function is operating in the first embodiment.

The following is an explanation of the process the control section 14 carries out when receiving the job of requesting the accelerator function in a copy operation. FIG. 4 is a flowchart to help explain the process.

First, the control section 14 determines whether the PC 3 has made a request for the accelerator function (ST101). If having determined that the PC 3 has not made such a request, the control section 14 continues the standby state. If having determined that the PC 3 has made a request for the accelerator (YES in ST101), the control section 14 determines whether there is a copy operation at that time (ST102). If having determined that there is no copy operation, the control section 14 determines an image processing path for the job (ST103) and executes the requested accelerator function (ST104). Then, the control section 14 determines whether there is another accelerator request (ST105). If there is not another accelerator request, the control section 14 ends the process. If there is another request, the control section 14 returns control to step ST102. In step ST102, if having determined that there is a copy operation, the processing path decision section 141 compares the image processing path used in the copy process with the image processing path for executing the accelerator function to determine whether there is a part where the image processing paths overlap each other (ST106). Then, on the basis of the determination, the control section 14 determines whether a simultaneous operation is possible (ST107). If having determined that a simultaneous operation is possible, the control section 14 passes control to step ST103, where it carries out the processes in steps ST104 and ST105. If having determined that a simultaneous operation is not possible, the control section 14 registers the job in the management table 151 of the memory section (ST108). Then, the control section 14 determines whether another job using the accelerator has been stored in the management table 151 (ST109). If having determined that another job has been registered in the management table 151, the control section 14 compares the image processing path used in the copy process with the image processing path of the job to determine whether there is a part where the image processing paths overlap each other (ST110). This process is carried out for all of the jobs registered in the management table 151. Then, the control section 14 determines whether there are jobs capable of operating simultaneously with a copy operation (ST111). If having determined that there is a job capable of operating simultaneously with a copy operation, the control section 14 searches for a job using the same parameter as that already set in each image processing in the image processing path of the job (ST112). Then, on the basis of the result of the search, if there is a job using the same parameter, the control section 14 gives priority to the job in selection. If there is no job with the same parameter setting, the control section 14 selects one from the jobs capable of operating simultaneously, for example, the one stored earliest in the HDD section (ST113). When the job has been selected in this way, the control section 14 passes control step ST103 and carries out the processes in steps ST104 and ST105. If having determined in step ST111 that there is no job capable of operating simultaneously, the control section 14 determines whether the copy operation has been completed (ST112) and waits for the execution of the accelerator function until the copy operation is completed. When the copy operation has ended, the control section 14 passes control to step ST103 and carries out the processes in steps ST104 and ST105, thereby processing the jobs.

Next, the operation of the image processing apparatus 1 will be explained using a case where the PC 3 has made a request for the execution of the accelerator function of subjecting color image data to image processing, when the image forming apparatus 1 is in a monochrome copy operation.

First, a first image processing path when the image forming apparatus 1 is in a monochrome copy operation will be explained. The path switching control section 114 is controlled on the basis of the image processing path determined by the processing path decision section 141, thereby switching each of the path switching sections 113a to 113d, which determines the first image processing path. Specifically, the scanning image processing section 11 selects the monochrome scanning image processing section 112 and the print image processing section 18 selects the monochrome print image processing section 182. Therefore, the image data read by the scanner section 10 is subjected to scanning image processing at the monochrome scanning image processing section 112 and then is written into the page memory 13 via the page memory control section 12 temporarily. Then, after a specific amount of the image data is recorded into the page memory 13, one page of the image data is read and stored into the HDD section 16. The stored image data is read according to a request made by the print side and transferred again to the print image processing section 18 via the page memory control section 12 and page memory 13. The transferred image data is subjected to print image processing at the monochrome print image processing section 182 and then is transferred to the printer section 19, which performs printing. The image data passes through the first image processing path, thereby carrying out a monochrome copy operation. In FIG. 1, the first image processing path is represented by a bold solid line.

The following is an explanation of a second image processing path which processes color image data in a case where the job of requesting the accelerator function of processing compressed color image data is received from the PC 3 during the monochrome copy operation of processing images in the first image processing path. In the second image processing path, data passes through the HDD section 16, page memory control section 12, expansion section 185, color print image processing section 181, color scanning image processing section 111, compression section 115, page memory control section 12, page memory 13, and HDD section 16 in that order.

The first image processing path used in a monochrome copy operation does not overlap the second image processing path used in the accelerator function. Therefore, the job of requesting the accelerator is executed immediately. Specifically, to process color image data in the second image processing path, the path switching control section 184 is controlled on the basis of the image processing path determined by the processing path decision section 141, thereby switching the path switching sections 183a to 183d. As a result, the color print image processing section 181 is selected in the print image processing section 18 and the color scanning image processing 111 is selected in the scanning image processing section 11. In FIG. 1, the second image processing path is shown by a bold broken line.

Then, the color image data read from the HDD section 16 is transferred to the print image processing section 18 via the page memory control section 12 and page memory 13. In the print image processing section 18, first, the compressed color image data is decoded at the expansion section 185. The decoded color image data is processed by the color print image processing section 181 (if unnecessary, this process is omitted) and the resulting data is outputted to the scanning image processing section 11. The outputted color image data is processed by the color scanning image processing section 111 in the scanning image processing section 11 (at this time, only the image processing item requested by the PC 3 is carried out). The processed color image data is compressed into compressed data again at the compression section 115. The compressed data is returned to the HDD section 16 via the page memory control section 12 and page memory 13. Then, since information that the image processing requested for the relevant file has been completed is displayed on the PC 3, the PC 3 reads the processed file from the HDD section 16 via the network control section 17 and ends the process.

As described above, each of the scanning image processing section 11 and print image processing section 18 in the image forming apparatus 1 has a processing section for processing color image data and a processing section for processing monochrome image data in separate form. Therefore, the image processing path in a monochrome copy operation may not overlap the image processing path in the execution of the accelerator function of processing color image data. Accordingly, when the image processing paths do not overlap each other, the image forming apparatus 1 can execute the accelerator function simultaneously with a copy operation. This alleviates restrictions on the accelerator function due to a copy operation, which enables a copy operation and the accelerator function to be performed at the same time.

When there is an accelerator request to process monochrome image data in a color copy operation, since the image processing paths do not overlap each other as described above, the color copy operation and the accelerator function can be executed simultaneously.

Furthermore, the image forming apparatus 1 gives priority to image processes with the same contents (or with the same parameter settings) in carrying them out consecutively in a copy operation. For example, in the case of the management table 151 explained by reference to FIG. 3, if job number 00 has been executed in a copy operation, job number 03 with the same image processing contents is selected as the job to be executed next and has priority over other jobs in processing. As a result, the number of times that the parameter setting for each image processing is changed on a job basis can be reduced, which enables the accelerator process to be carried out efficiently.

Second Embodiment

Figure 5:
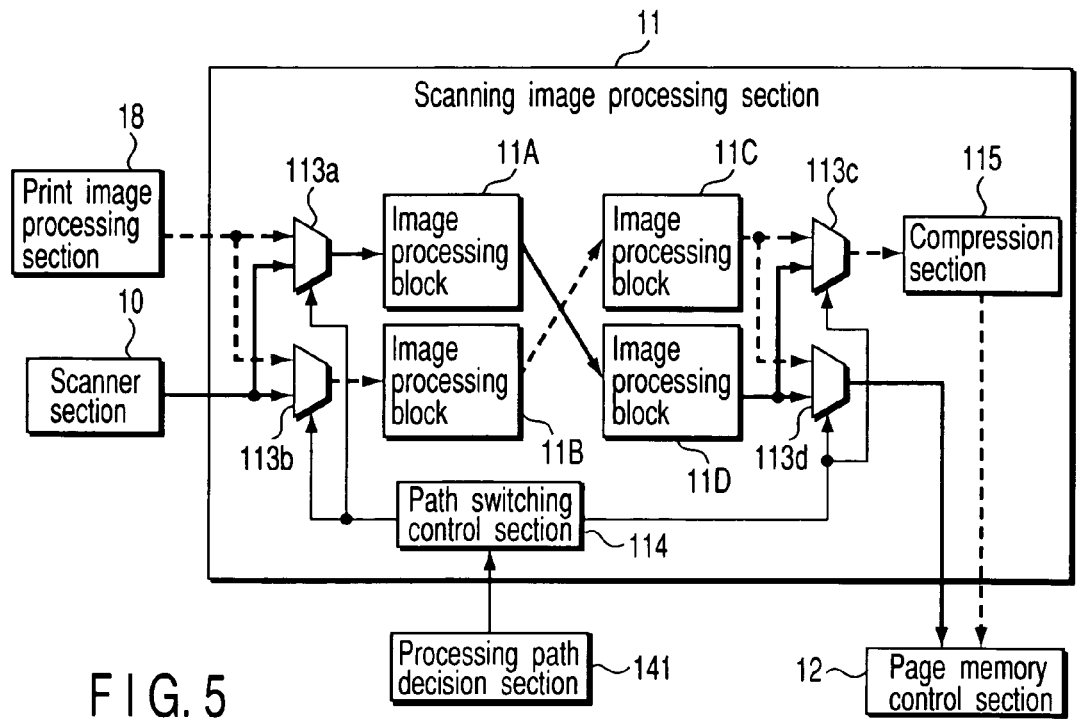
FIG. 5 shows an internal configuration of a scanning image processing section according to a second embodiment of the present invention.
Figure 6:
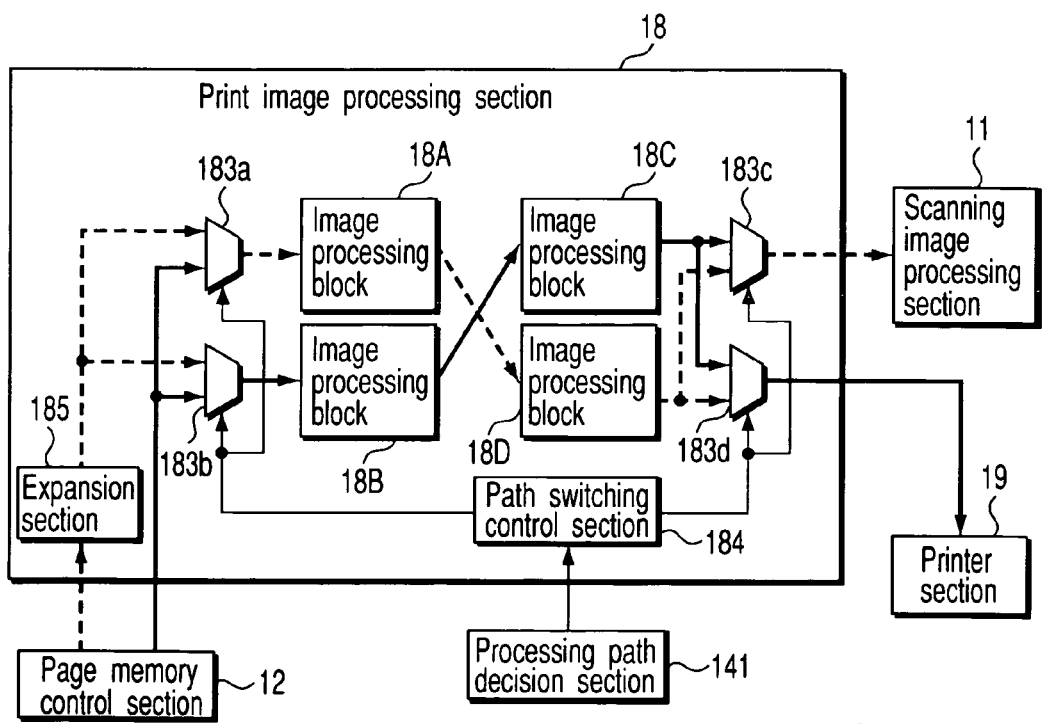
FIG. 6 shows an internal configuration of the print image processing section of the second embodiment.

Next, a second embodiment of the present invention will be explained. The same parts as those in the first embodiment are indicated by the same reference numerals and a detail explanation of them will be omitted. In the second embodiment, the scanning image processing section 11 is composed of separate image processing blocks, or image processing blocks 11A, 11B, 11C, 11D as shown in FIG. 5, and the print image processing section 18 is composed of separate image processing blocks, or image processing clocks 18A, 18B, 18C, 18D as shown in FIG. 6. Each of the image processing blocks is designed to subject image data to different processing. The processing path decision section 141 selects an image processing block to perform processing and determines an image processing path on the basis of the user's instruction from the control panel (not shown) in a copy operation or on the basis of the user's instruction from the PC in the execution of the accelerator function. Since the configuration excluding the scanning image processing section 11 and print image processing section 18 is the same as that of the first embodiment, diagrammatic representation and explanation will be omitted.

Next, the first image processing path in a copy operation with the image forming apparatus 1 configured as described above will be explained. In the first image processing path, on the basis of the image processing path determined by the processing path decision 141, the scanning image processing section 11 selects the image processing block 11A and the image processing block 11D and the print image processing section 18 selects the image processing block 18B and the image processing block 18C. The first image processing path is shown by a bold solid line in FIGS. 5 and 6. Tracing the path, the path switching control sections 114, 184 switch the path switching sections 113a to 113d and the path switching sections 183a to 183d. In the image forming apparatus 1, the image read by the scanner section 10 is subjected to image processing in the first image processing path and the resulting image is printed at the printer section 19. In this way, printing is done.

The following is an explanation of a second image processing path used in the job when the job of requesting the accelerator function of processing compressed color image data is received from the PC 3 in a copy operation. In the second image processing path, for example, on the basis of the image processing path determined by the processing path decision 141, the scanning image processing section 11 selects the image processing block 11B and the image processing block 11C and the print image processing section 18 selects the image processing block 18A and the image processing block 18D. The second image processing path is shown by a bold broken line in FIGS. 5 and 6.

The comparison of the image processing path with the image processing path used in the copy operation has shown that there is no part where the same path is used, that is, the image processing paths do not overlap each other. Therefore, the image forming apparatus 1 enables the image processing in a copy operation and the image processing in the execution of the accelerator function to be performed at the same time. Thus, tracing the second image processing path, the path switching control sections 114, 184 switch the path switching sections 113a to 113d and the path switching sections 183a to 183d, thereby executing the accelerator function in the copy operation.

As described above, the scanning image processing section 11 is composed of a plurality of image processing blocks 11A to 11D each of which subjects image data to different processing. The print image processing section 18 is composed of a plurality of image processing blocks 18A to 18D each of which subjects image data to different processing. Therefore, the image processing path in a copy operation may not overlap the image processing path in the execution of the accelerator function. Thus, when the image processing paths do not overlap each other, the image forming apparatus 1 can execute the accelerator function simultaneously in the copy operation. This alleviates restrictions on the accelerator function due to a copy operation, which enables a copy operation and the accelerator function to be performed simultaneously.

While in each of the first and second embodiments, the explanation has been given using the case where the job of requesting the accelerator function is received during a copy operation, the present invention is not limited to this. When a request for a copy operation is made during the execution of the accelerator function, an image processing path used in a copy operation can be obtained from the user's instruction from the control panel. At this time, the copy operation is given priority in processing. When the processing path decision section 141 has determined that the image processing paths are different from one another, the execution of the accelerator function is not stopped but continued, which enables simultaneous operation.

Furthermore, the accelerator function in the image forming apparatus is generally given lower priority than other processes, including a copy operation. Therefore, the operating speed of the accelerator function is fixed to a low speed so that the accelerator function can operate even when the load on the entire system of the image forming apparatus 1 is high. With this setting, the performance of the accelerator function is degraded when the load on the entire system is low. Consequently, even if a copy operation and the accelerator function can be executed simultaneously as in the image forming apparatus 1 in each of the first and second embodiments, the performance of the accelerator function cannot be maximized. In a third and a fourth embodiment of the present invention below, explanation will be given about an image forming apparatus 1 capable of selecting the operating speed of the accelerator function during a copy operation suitably according to the load on the entire system.

Third Embodiment

Figure 7:
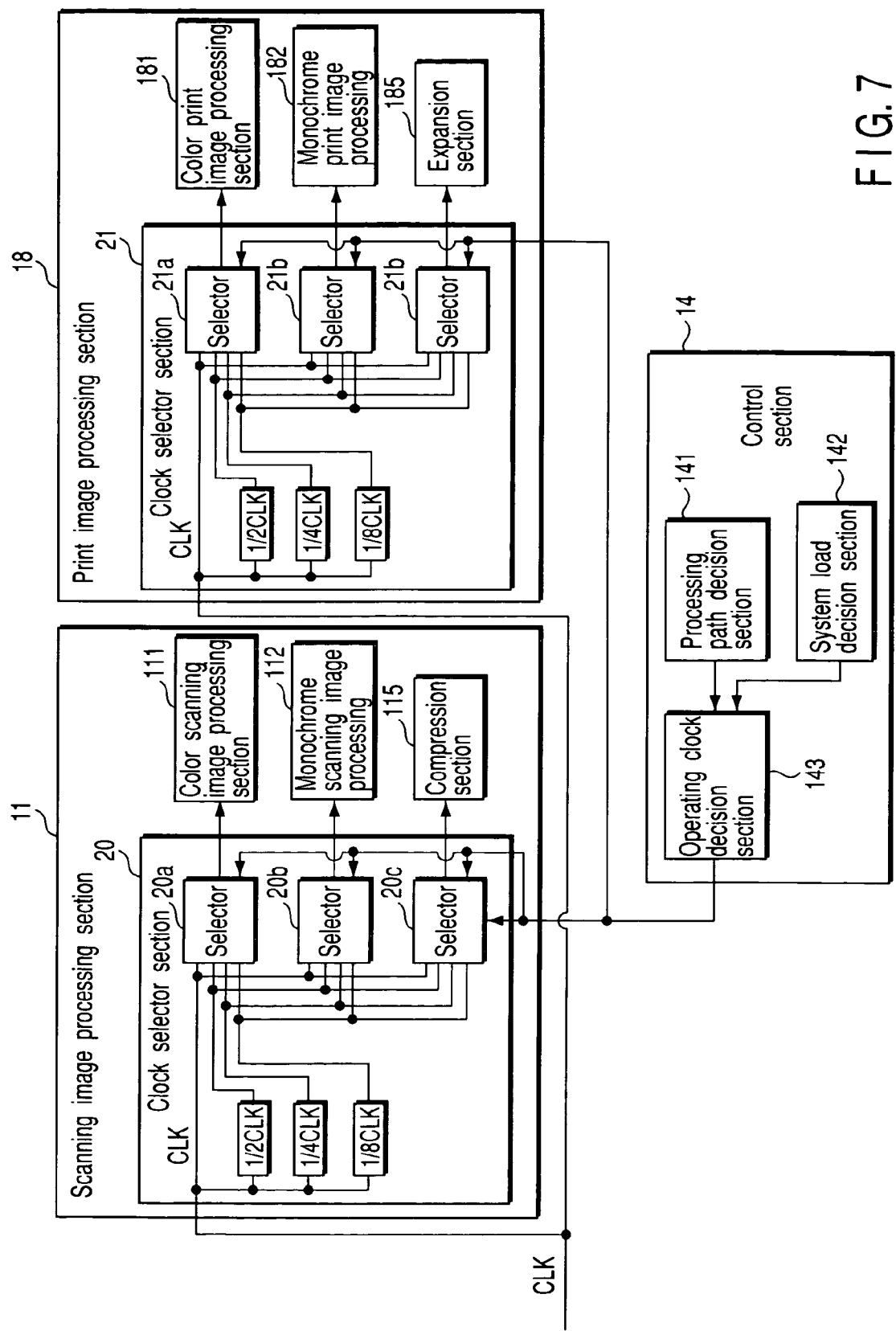
FIG. 7 shows a configuration for selecting a clock for each image processing section suitably according to the load on the system in a third embodiment of the present invention.

A third embodiment of the present invention will be explained. The same parts as those in the first embodiment are indicated by the same reference numerals and a detail explanation of them will be omitted. As shown in FIG. 7, the third embodiment comprises a clock selector section 20 for selecting a clock to be supplied to each image processing section in the scanning image processing section 11 and a clock selector section 21 for selecting a clock to be supplied to each image processing section in the print image processing section 18. Thus, the clock selector section 20 selects a clock to be supplied to the color scanning image processing section 111, monochrome scanning image processing section 112, and compression section 115. The clock selector section 21 selects a clock to be supplied to the color print image processing section 181, monochrome print image processing section 182, and expansion section 185. To control the clock supplied from the clock selector sections 20, 21 to each image processing section, the control section 14 includes not only the processing path decision section 141 but also a system load decision section 142 and an operating clock decision section 143. The system load decision section 142 and operating clock decision section 143 may be realized in the form of software processing or hardware processing. Since the remaining configuration is the same as that of the first embodiment, an explanation of it will be omitted.

The clock selector section 20 includes selectors 20a, 20b, 20c. The clock selector section 21 includes selectors 21a, 21b, 21c. An externally supplied clock (CLK), ½ CLK or a clock whose operating speed is half of CLK, ¼ CLK or a clock whose operating speed is half of ½ CLK, and ⅛ CLK or a clock whose operating speed is half of ¼ CLK are supplied to the selectors 20a to 20c and the selectors 21a to 21c. The selector 20a selects a clock to be supplied to the color scanning image processing section 111. The selector 20b selects a clock to be supplied to the monochrome scanning image processing section 112. The selector 20c selects a clock to be supplied to the compression section 115. The selector 21a selects a clock to be supplied to the color print image processing section 181. The selector 21b selects a clock to be supplied to the monochrome print image processing section 182. The selector 21c selects a clock to be supplied to the expansion section 185. These selectors 20a to 20c and 21a to 21c are designed to select the operating clocks to be supplied to the individual image processing sections, according to the instruction from the operating clock decision section 143.

The system load decision section 142 determines the load on the entire system of the image forming apparatus 1. For example, the load applied to the entire system of the image forming apparatus 1 in copying a color image differs from that in copying a monochrome image. The magnitude of the load applied to the entire system including the image processing system is determined by referring to a preset table.

The operating clock decision section 143 determines which operating clock to use on the basis of the result of the determination made by the processing path decision section 141 and the result of the determination made by the system load decision section 142 in order that the image processing section in each of the scanning image processing section 11 and print image processing section 18 operates properly. For example, when no load is applied to the system as when a copy operation is not being carried out, a determination is made so as to cause the accelerator function to operate using the normal CLK. When a monochrome copy operation is being carried out, this applies a load to the system. Therefore, a determination is made so as to cause the accelerator function to operate using a slower clock than CLK, or ¼ CLK. In addition, when a color copy operation is being carried out, this applies a higher load to the system. Therefore, a determination is made so as to cause the accelerator function to operate using a much slower clock than ¼ clock, or ⅛ CLK. The operating clock determined this way is notified to the selectors 20a to 20c and 21a to 21c of the clock selector sections 20, 21.

Next, the timing of the processing of the system load decision section 142 and operating clock decision section 143 will be explained. FIG. 8 is flowchart to help explain the timing of the processing. Since FIG. 8 is obtained by inserting the processes in steps ST201 to ST203 between steps ST103 and ST104 of FIG. 4, an explanation of the processes excluding those in ST201 to ST203 will be omitted.

In step ST103, after a processing path is set, the system load decision section 142 determines the load on the entire system (ST201). Then, on the basis of the determination of the load, the operating clock decision section 143 makes a determination so that the operating clock in the image processing section in each of the scanning image processing section 11 and print image processing section 18 may operate suitably and gives an instruction to the selectors 20a to 20c and 21a to 21c (ST202). On the basis of the instruction from the operating clock decision section 143, the selectors 20a to 20c and 21a to 21c select operating clocks to be outputted (ST203). In this way, after the operating clocks to be supplied to the respective image processing sections in the scanning image processing section 11 and print image processing section 18 have been selected, control proceeds to step ST104.

The following is an explanation of the operation of the image forming apparatus 1 when receiving the job of requesting the image color accelerator function during a monochrome copy operation. At this time, since the copy operation is given higher priority, CLK with the normal processing speed is supplied to the monochrome scanning image processing section 112 and monochrome print image processing section 182 in a monochrome copy operation. On the other hand, the clock to be supplied to the color scanning image processing section 111, compression section 115, expansion section 185, and color print image processing section 181 on the accelerator function side is selected according to the load on the entire system. For instance, when a high load is not applied to the entire system, either ¼ CLK or ½ CLK is selected according to the magnitude of the load. When a high load is applied to the system, ⅛ CLK is selected.

As a result, the clock speed in executing the accelerator function which was set in the prior art so as to be always ⅛ CLK on the assumption that the load on the entire system is the highest can be increased in the range that has no effect on the copy operation. This enables the performance of the accelerator function of the image forming apparatus 1 to be improved. Specifically, when the first image processing path in a copy operation does not overlap the second image processing path for the accelerator function and therefore it is determined that simultaneous operation is possible, the load on the entire system is determined. Then, in each image processing section on the accelerator function side, the highest-speed operating clock is selected in the range that has no effect on the copy operation, which enables the accelerator function to operate efficiently.

Fourth Embodiment

A fourth embodiment of the present invention will be explained. The same parts as those in the second embodiment are indicated by the same reference numerals and a detail explanation of them will be omitted. As shown in FIG. 9, the fourth embodiment comprises a clock selector section 22 for selecting a clock to be supplied to each image processing section in the scanning image processing section 11 and a clock selector section 23 for selecting a clock to be supplied to each image processing section in the print image processing section 18. Thus, the clock selector section 22 selects a clock to be supplied to the image processing blocks 11A to 11D and compression section 115. The clock selector section 23 selects a clock to be supplied to the image processing blocks 18A to 18D and expansion section 185. To control the clock supplied from the clock selector sections 22, 23 to each image processing section, the control section 14 includes not only the processing path decision section 141 but also the system load decision section 142 and operating clock decision section 143. The system load decision section 142 and operating clock decision section 143 may be realized in the form of software processing or hardware processing. In addition, the system load decision section 142 and operating clock decision section 143 basically perform the same operation as those in the third embodiment. Since the remaining configuration is the same as that of the second embodiment, an explanation of it will be omitted.

As shown in FIG. 9, the clock selector section 22 includes selectors 22a to 20e. The clock selector section 23 includes selectors 23a to 23e. An externally supplied clock CLK, ½ CLK or a clock whose operating speed is half of CLK, ¼ CLK or a clock whose operating speed is half of ½ CLK, and ⅛ CLK or a clock whose operating speed is half of ¼ CLK are supplied to the selectors 22a to 22e and the selectors 23a to 23e. The selectors 22a to 22e select clocks to be supplied to the image processing blocks 11a, 11B, 11C, 11D and the compression section 115 in the scanning image processing section. The selectors 23a to 23e select clocks to be supplied to the image processing blocks 18A, 18B, 18C, 18D and the expansion section 185. These selectors 22a to 22e and 23a to 23e are designed to select clocks to be supplied to the individual processing sections, according to the instruction from the operating clock decision section 143.

As described above, in the image forming apparatus 1, the scanning image processing section 11 is composed of the image processing blocks 11A to 11D for subjecting image data to different processing and the compression section 115, the print image processing section 18 is composed of the image processing sections 18A to 18D and the expansion section 185. With this configuration, the clock selector sections 22, 23, system load decision section 142, and operating clock decision section 143 are provided in the image forming apparatus 1, which makes it possible to increase the clock speed in executing the accelerator function set so as to be always ⅛ CLK on the assumption that the load on the entire system is the highest in the range that has no effect on the copy operation. As a result, the performance of the accelerator function of the image forming apparatus 1 can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and their equivalents thereof.

What is claimed is:

1. An image forming apparatus comprising:
   an interface which receives a job of requesting an accelerator function, from the outside;
   a processing path decision section which determines whether a first image processing path to perform image processing in a copy operation overlaps a second image processing path to perform image processing in the execution of the accelerator function, which has a lower priority than the copy operation, in the job received via the interface;
   a storage section which stores a management table to manage waiting jobs unable to execute the accelerator function;
   a search section which searches the management table for a job where the first image processing path does not overlap the second image processing path to perform image processing in the execution of the accelerator function in the waiting jobs; and
   an image processing section which performs image processing in a copy operation and image processing in the execution of the accelerator function at the same time, when the processing path decision section determines that the first image processing path does not overlap the second image processing path, in the case where a request is made for the execution of the accelerator function in the job received via the interface in a copy operation,
   wherein when the processing path decision section determines that the first image processing path overlaps the second image processing path, the image processing section registers the job received via the interface in the management table as being one of the waiting jobs unable to execute the accelerator function, and executes a job searched for by the search section.

2. The image forming apparatus according to claim 1, wherein the management of the management table includes a parameter used in image processing requested by the accelerator function requested by the waiting jobs.

3. The image forming apparatus according to claim 2, further comprising:
   a selector section which selects a job when a parameter managed in the management table for the job searched for by the search section coincides with a parameter already set in image processing performed in the image processing path of the job, wherein
   the image processing section, when the job searched for is present, gives priority to the job selected by the selector section, in processing.

4. The image forming apparatus according to claim 1, wherein the image processing section includes a color image data processing section which processes color image data and a monochrome image data processing section for processing monochrome image data, and
   each of the first image processing path and the second image processing path is a path which passes through either the color image data processing section or the monochrome image data processing section.

5. The image forming apparatus according to claim 4, further comprising:
   a system load decision section which determines the magnitude of a system load;
   an operating clock decision section which determines operating clocks for at least one of the color image data processing section and the monochrome image data processing section, on the basis of the load determined at the load decision section; and
   a clock setting section which sets operating clocks in the color image data processing section and the monochrome image data processing section, in accordance with the determination of the operating clock decision section.

6. The image forming apparatus according to claim 1, wherein the image processing section includes a plurality of image processing blocks each of which subjects image data to different processing, wherein
   each of the first image processing path and the second image processing path is a path which passes through said plurality of image processing blocks in a different manner.

7. The image forming apparatus according to claim 6, further comprising:
   a system load decision section which determines the magnitude of a system load;
   an operating clock decision section which determines an operating clock for at least each of said plurality of image processing blocks, on the basis of the load determined at the load decision section; and a clock setting section which sets an operating clock for each of said plurality of image processing, in accordance with the determination of the operating clock decision section.

8. The image forming apparatus according to claim 1, further comprising:

a system load decision section which determines the magnitude of a system load;

an operating clock decision section which determines an operating clock for each processing section included in the image processing section on the basis of the load determined at the load decision section; and a clock setting section which sets a clock operation for each of the processing sections according to the determination of the operating clock decision section.

9. The image forming apparatus according to claim 8, wherein the clock setting section which sets the clock operation for each of the processing sections according to the determination of the operating clock decision section as being either a first clock speed of an external clock signal, a second clock speed corresponding to one-half the first clock speed, or a third clock speed corresponding to one-quarter of the first clock speed.

* * * * *